United States Patent
Hosoe et al.

[11] 3,820,129
[45] June 25, 1974

[54] FOCUSING DEVICE FOR OPTICAL INSTRUMENTS

[75] Inventors: Kazuya Hosoe, Kawasaki; Seiichi Matsumoto, Tokyo; Noritaka Mochizuki, Kamakura, all of Japan

[73] Assignee: Canon Kabushiki Kaisha, Tokyo, Japan

[22] Filed: May 26, 1972

[21] Appl. No.: 257,138

[30] Foreign Application Priority Data
June 1, 1971    Japan................................. 46-37991
June 1, 1971    Japan................................. 46-37992

[52] U.S. Cl. .................. 354/25, 95/44 R, 353/101
[51] Int. Cl. ............................................. G03b 3/10
[58] Field of Search ............... 95/44 R, 44 C, 45; 352/140; 353/101; 355/55, 66, 61, 62, 68

[56] References Cited
UNITED STATES PATENTS

| | | | |
|---|---|---|---|
| 2,472,907 | 6/1949 | Kolesnikoff | 355/62 |
| 3,393,622 | 7/1968 | Sholtle et al. | 95/44 R |
| 3,427,947 | 2/1969 | Racki | 95/44 R |
| 3,435,744 | 4/1969 | Stimson et al. | 95/44 C |
| 3,511,155 | 5/1970 | Yamada | 95/44 R |
| 3,517,992 | 6/1970 | Holle | 353/101 |
| 3,538,833 | 11/1970 | Koeber, Jr. | 95/44 C |
| 3,544,214 | 12/1970 | Eggar | 355/68 |
| 3,596,101 | 7/1971 | Someya et al. | 352/140 X |
| 3,614,921 | 10/1971 | Yamanaka et al. | 95/45 |
| 3,618,499 | 11/1971 | Harvey | 95/44 C X |

*Primary Examiner*—Samuel S. Matthews
*Assistant Examiner*—E. M. Bero
*Attorney, Agent, or Firm*—Flynn & Frishauf

[57] ABSTRACT

A focusing device for optical instruments such as cine-cameras and the like includes a ray receiving optical system for transmitting therethrough a beam of radiation such as light coming in from an object and for forming such radiation beam into an image, photoelectric converter means for receiving the radiation from the object through said optical system and converting the same into an electrical signal, and an electric circuit for receiving the signal from the photoconverter means to produce a signal necessary to control an image forming optical system which is adjustable for focusing. The ray receiving optical system converges the radiation beam from the object to form a single image on the photoelectric converter means. The photoelectric converter means comprises a photoelectric converter element having at least two photoelectric converter portions functioning individually but contiguous with each other along a confine therebetween. The focused condition accomplished by the said device may be displayed within the viewfinder of an optical instrument.

23 Claims, 27 Drawing Figures

PATENTED JUN25 1974 3,820,129

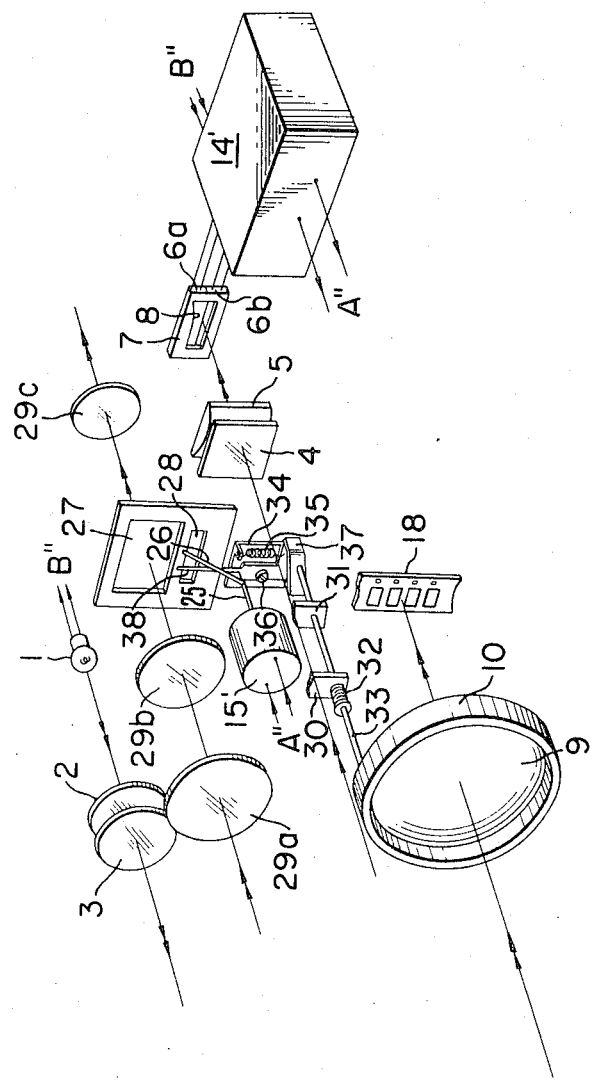

FOCUSING DEVICE FOR OPTICAL INSTRUMENTS

BACKGROUND OF THE INVENTION

1. Field of the Invention

This invention relates to a focusing device for optical instruments, and more particularly to such a focusing device in which a beam of radiation such as light rays coming in from an object may be transmitted through a ray receiving optical system and formed into a single image on photoelectric converter means so as to be thereby converted into an electrical signal varying with object distance, by which an image forming optical system may be properly focussed for effecting a picture taking operation.

2. Description of the Prior Art

In the optical instruments such as cinecameras and the like, there have heretofore been proposed several types of devices for automatically detecting the focal point and thereby accomplishing the focusing.

For example, a device is known which utilizes the principle of the reference line range finder to move an optical system so as to form a superposed double image resulting from light rays coming in from an object, thereby detecting the focal point. The focusing device utilizing such a principle requires movable elements of an optical system for causing declination of light beam, or of a photoelectric converter means, be moved as a fundamental factor.

Also, German Utility Model No. 7,010,065 discloses a device in which a beam of light coming in from an object is split and focused on two or more photoelectric converter elements disposed in spaced apart relationship, to thereby measure the object distance. In such a device, however, much difficulty has been encountered in positioning at least two spaced-apart photoelectric converter elements and in precisely adjusting to a desired value the quantity of light reflected by a beam splitter which is an essential element to such device. Further, it has been unavoidable in the manufacturing process that more or less difference occurs in the photoelectric converting characteristic between the two or more photoelectric converter elements. Such a difference has ultimately led to a reduced accuracy of distance measurement in the cases where the outputs of the two or more photoelectric converter elements are compared with each other.

In order to display the focused condition of a cinecamera or the like within the viewfinder thereof, it has generally been the practice to resort to optical means such as microprism or split image. Such a focusing system using the conventional optical means will theoretically provide a very high accuracy of focusing, but actually it has required a considerably careful operation to achieve proper focusing and this has compelled the operator to be very much experienced and skilled technically before he is able to quickly and successively photograph objects at various distances.

SUMMARY OF THE PRESENT INVENTION

It is an object of the present invention to eliminate the above-noted disadvantages existing in the conventional devices and to provide a focusing device for optical instruments which ensures a very high accuracy of focusing.

It is another object of the present invention to provide a focusing device for optical instruments in which a beam of radiation such as light rays coming in from an object is transmitted through a ray receiving optical system so as to impinge as a single image on the ray receiving surface of photoelectric converter means, which in turn converts such image into an electrical signal so that the electrical signal may be treated by an electric circuit for providing information necessary to adjust an image forming optical system for photographing or the like.

It is still another object of the present invention to provide a focusing device for optical instruments which does not employ the conventional two or more spaced-apart photoelectric converter elements but a single photoelectric converter having at least two photoelectric element portions contiguous with each other along a straight line boundary.

It is yet another object of the present invention to provide a focusing device for optical instruments in which a beam of radiation such as light rays coming in from an object is formed into a single image through a ray receiving optical system having an image forming characteristic and such image is applied as an input to photoelectric converter means comprising at least two photoelectric converter elements, whereby the output of such photoelectric converter means is displayed in or near a viewfinder independently or in connection with a picture-taking optical system.

It is a further object of the present invention to provide a focusing device for optical instruments which comprises a ray projecting optical system and a ray receiving optical system for causing a radiation image to be moved along or across the aforesaid boundary in accordance with an object distance and to provide that the output of photoelectric converter means to which said radiation image is applied as input through the ray receiving optical system is converted into a displacement of a meter needle or a flash of luminous means which may be displayed in or near the field of a viewfinder.

It is still a further object of the present invention to provide a focusing device for optical instruments in which when the picture-taking optical system is in proper focused condition the output of photoelectric converter means assumes a predetermined value in response thereto.

It is yet a further object of the present invention to provide a focusing device for optical instruments in which the output of photoelectric converter means is converted into a flash of luminous means in dependence of the focused condition of the picture-taking optical system and such flash is displayed.

It is yet still a further object of the present invention to provide a focusing device for optical instruments in which means is provided for indicating the depth of field in dependence of the focused condition of the picture-taking optical system.

It is still a further object of the present invention to provide a focusing device for optical instruments in which photoelectric converter means capable of detecting information representative of an object distance is provided and one photoelectric element in the converter means is fixed while another photoelectric element therein provided with a mask is disposed at a position where radiation from an object is focused into an image by utilizing the principle of a reference line range finder, whereby information representing the focused image position, i.e. information representing the object distance and information representing the position of the picture-taking optical system are compared with each other by electrical means so as to move the picture-taking optical system until the difference between the two types of information becomes zero, thus accomplishing the focusing of the picture-taking optical system.

With the device according to a preferred embodiment of the present invention, the picture-taking optical system may be moved until a meter needle assumes a predetermined position or a lamp is turned on, thereby properly adjusting the focus. This will readily enable any unskilled photographer to accomplish proper focusing within a very short time. Where a continuous picture-taking operation is effected with a cine-camera or the like, it is apparent that the length of time required for the focusing with respect to an object aimed at, namely the degree of difficulty in focusing, will fatally affect the quality of the resultant photographs. According to the present invention, most embodiments of the system for displaying the focused condition in the viewfinder can also display the direction in which the picture-taking optical system is to be rotated during the focusing thereof with respect to an object, and this enables the focusing operation to be done quickly.

Further, one form of the device of the present invention increases its accuracy by displaying not only the focused condition but also the depth of field determined by such factors as the current focal distance, position and relative aperture of the picture-taking optical system, thereby ensuring this optical system to be set within the depth of field.

Also, according to a preferred embodiment of the present invention, the photoelectric converter means in the optical system is not moved but may be stationary and a photoelectric image position detector comprising two masked photoelectric converter elements contiguous with each other along a straight line boundary is employed to detect by virtue of mask shape the position of an image formed through the optical system of the reference line range finder in accordance with the object distance, whereby a signal representing the detected image position or the object distance and a signal representing the position of the picture-taking optical system are compared with each other by an electrical means so that the picture-taking optical system is moved until the difference between the two signals becomes zero, thus automatically adjusting the focus of the picture-taking optical system.

Furthermore, instead of employing a servomotor in the automatic focusing system to drive the picture-taking optical system, it is possible to arrange the device so that the output from an electric circuit is supplied to a meter to enable a picture-taking optical system to be manually or otherwise moved to set the meter needle to a predetermined position and thereby properly focus the picture-taking optical system. For this purpose, the meter needle and mark means for indicating the properly focused condition may be provided in or near the viewfinder so as to enable the operator to look into the viewfinder and move the picture-taking optical system to a properly focused position.

According to a further preferred embodiment of the present invention, similar display of the focused condition may be accomplished by arranging the device so that the position of the meter needle indicates the object distance while another needle is provided to indicate the position of the picture-taking optical system, the latter needle being adapted to overlap the meter needle to thereby enable proper focusing of the picture-taking optical system.

According to the above-described method, the focusing may be automatically or semi-automatically effected with greater ease than the conventional focusing effected by using optical means, and this is expected to be fully effective especially in the art of motion picture taking which is often directed to the continuous photographing of moving objects.

BRIEF DESCRIPTION OF THE DRAWINGS

Other objects and features of the present invention will become fully apparent from the following detailed description of various embodiments taken in conjunction with the accompanying drawings, in which:

FIG. 14 is a schematic perspective view showing a specific example of the device to which the present invention is applicable;

DESCRIPTION OF THE PREFERRED EMBODIMENTS

Figure 1:
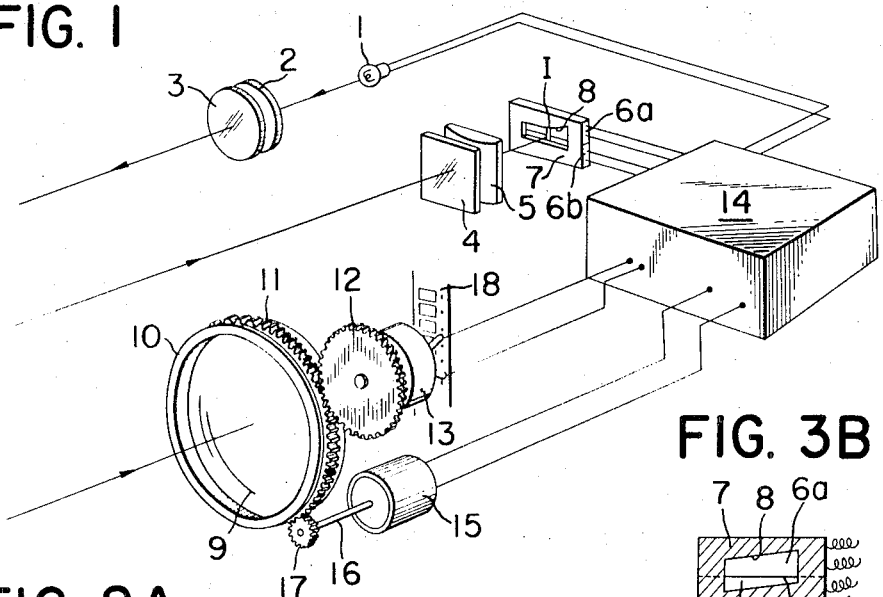
FIG. 1 is a schematic perspective view showing the basic construction of the focusing device for optical instruments according to an embodiment of the present invention.

Referring to FIG. 1, a radiation source 1 is provided to emit a range finding radiation which may be effectively projected on an object through an optical system 2 and through a filter 3 for confining the radiation into any desired wavelength range. The filter 3 may be selected for any desired component of the radiation, and for example, may be an infrared filter if it is desired to project only the infrared component of the radiation. The radiation source 1, optical system 2 and filter 3 together constitute a projector device for projecting a beam of radiation. The beam of radiation emitted from the radiation source 1 may be formed into a parallel beam of radiation by the optical system 2 so as to form a spot of radiation on the object. If the radiation emitted from the radiation source 1 is previously amplitude-modulated by a pulse generator included in an electric circuit which will be described later, then a signal may be efficiently taken out without being interfered with by light other than that of the radiant source 1, i.e., by ambient light. On the other hand, a ray receiving system comprising a filter 4 and an optical system 5 is offset at a suitable distance from the optical axis of the projector so as to receive a beam of radiation coming from the illuminated spot on the object at an angle dependent on the object distance. The filter 4 performs the same function as the filter 3 and the two filters may be formed of the same material. The optical system 5 may expand the spot ray image formed on the object in a direction (vertical direction as viewed in FIG. 1) and focus such image as a linear image I on the focal plane of the optical system 5 or on a photoelectric image position detector disposed in the vicinity of such focal plane. The photoelectric image position detector may comprise two photoelectric elements 6a and 6b contiguous with each other along a straight line boundary and a mast 7 provided thereon for the purpose of detecting the image position. As will be described further, the photoelectric image position detector may produce an electrical output corresponding to the position of the object image formed thereon, and for this purpose, the detector has an opening 8 whose length is variable in the direction of displacement of the image in accordance with the shape of the mask so as to control the radiation impinging on the photoelectric elements.

As may be seen from FIG. 1, the line boundary between the photoelectric elements 6a and 6b is aligned with the direction of offset of the ray receiving means from the projector, along which direction the aforesaid spot ray image moves as the object distance changes. The elongation of the image by the cylindrical lens 5, as also appears in FIG. 1, is in a direction perpendicular to that of the boundary line between the photoelectric elements 6a and 6b.

Further, a picture-taking optical system 9 is held by and within a body tube 10, whose rotation may be transmitted by a gear 11 thereon via a gear 12 engaged with the gear 11 to the shaft of a potentiometer 13 coaxially coupled to the shaft of the gear 12, so that the potentiometer 13 may produce an electrical output substantially corresponding to the position of the picture-taking optical system in one-to-one relationship. The output from the photoelectric image position detector may be compared with the output from the potentiometer 13 by an electric circuit 14. More specifically, the signal representing the distance of the object from the picture-taking optical system and the signal representing the set position of the picture-taking optical system at the corresponding time are compared with each other by the electric circuit. If any difference exists between the two signals, a servo-circuit forming a part of the electric circuit 14 will drive to revolve a servomotor 15 in a direction determined by the magnitude of such difference and the relative magnitude of the signals, so that a pinion 17 mounted on one end of the shaft 16 of the servomotor 15 may drive the picture-taking optical system 9 along the optical axis thereof. The direction of rotation of the picture-taking optical system 9 is the direction in which the difference between the two signals is reduced by the servo-circuit, and therefore, by always feeding back the position signal of the picture-taking optical system 9 in accordance with the output from the potentiometer 13, the picture-taking optical system may be stopped at a point where the difference between the two signals becomes zero. From this, it will thus be seen that the picture-taking optical system 9 ensures the object image to be automatically and properly focused on a film 18 by pre-adjusting the potentiometer and the photoelectric image position detector so that the outputs thereof become equal when the distance corresponding to the output of the photoelectric image position detector and the distance aimed at by the picture-taking optical system become equal.

Figure 2A:
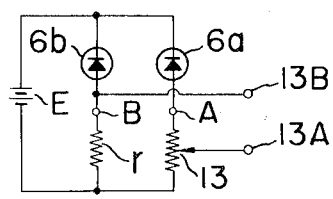
FIGS. 2A to 2C show various circuit arrangements of the photoelectric image position detector applicable to the device of FIG. 1.
Figure 2B:
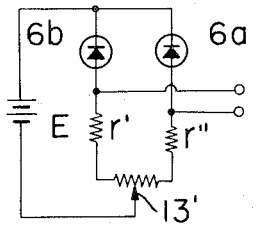

FIGS. 2A and 2B show examples of the electrical connection between the photoelectric elements 6a, 6b forming the photoelectric image position detector and the potentiometer 13.

In FIG. 2A, the photoelectric elements 6a, 6b are supplied with a reverse bias voltage from an electric source E. The potentiometer 13 is serially connected with the element 6a, and a fixed resistor r is serially connected with the element 6b. The photoelectric elements 6a and 6b are masked with a mask 7 in the manner as shown in FIGS. 3A to 3G. The opening 8 in the mask 7 includes therein a confine line C between the two elements 6a and 6b, and the shape of this opening 8 is variable with the position of the linear image I. Thus, in FIG. 2A, the potentials appearing at the ends A and B of the resistor r and the potentiometer 13 due to the outputs from the photoelectric elements 6a and 6b are variable with the position of the image. The response of the elements 6a and 6b depends on the amount of illumination they receive from the image I, which in turn depends on the width of the elements 6a and 6b where they are crossed by the elongated image I.

Figure 3A:
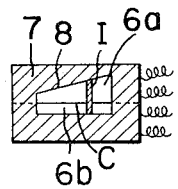
FIGS. 3A to 3G are plan views showing various forms of the masking for the photoelectric element forming the photoelectric image position detector applicable to the device of FIG. 1.
Figure 3B:
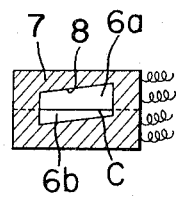
Figure 3C:
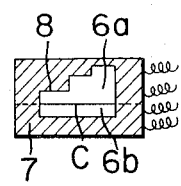
Figure 3D:
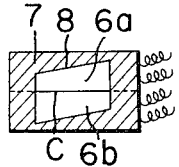
Figure 3E:
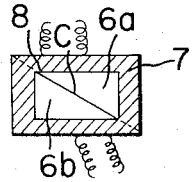
Figure 3F:
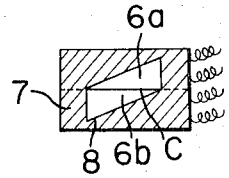
Figure 3G:
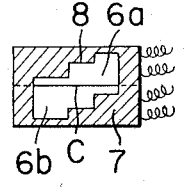

As shown in FIGS. 3A to C, the photoelectric elements 6a and 6b are masked in such a manner that the opening for controlling the radiation impinging on the element 6a is larger than that for the element 6b, and accordingly the radiation energy impinging on the element 6a is greater than that impinging on the element 6b. Therefore, if the maximum resistance value of the potentiometer 13 is equal to the resistance value of the resistor r, the potential at point A in FIG. 2A will be higher than that at point B irrespective of the position of the image. Thus, if the tapped point of the potentiometer 13 provides one of the output terminals 13A, the potentials at the two output terminals 13A and 13B may be equal to each other by adjusting the position of the output terminal 13A. If electrical elements at the next stage with which the output terminals 13A and 13B are connected have sufficiently great input impedances, there will be defined a single position for the point at which the potential at the tapped point of the potentiometer 13 equals the potential at the point B, and such a single position will correspond, in one-to-one relationship, to the ratio between the outputs produced at the photoelectric elements 6a and 6b, i.e., the position at which the image is formed on the two photoelectric elements. This means that the ratio between the outputs of the two photoelectric elements 6a and 6b is electrically converted into the position of the tapped point of the potentiometer, with a result that the position of the image with respect to the picture-taking optical system can be detected independently of the illumination on the image plane.

As the shape of the mask for controlling the quantity of radiation impinging on the photoelectric elements 6a, 6b in the electric circuit of FIG. 2A, the following alternatives may be conceivable: the shape as shown in FIG. 3A, where the length of that side of the opening adjacent to the photoelectric element 6b is constant while the length of the side adjacent to the photoelectric element 6a is continuously variable with the position of the image I; the shape as shown in FIG. 3B, where the lengths of those two sides of the mask opening are continuously variable with the position of the image I; or the shape as shown in FIG. 3C, where the length of one of those sides of the opening is discontinuously variable in the form of several steps. The mask having the last shape, i.e., the discontinuously variable shape, will be suitable for the so-called zone-focus range finding. It is essential to any of these mask shapes that the quantity of energy impinging on one of the two photoelectric elements be always greater than that impinging on the other photoelectric element irrespective of the position of the image. Also, any of the shown mask shapes will be convenient in that by placing such a mask in such a manner that the longer side of the opening thereof is disposed at the position where an image is formed by the radiation beam reflected from a remote object, it is possible to substantially avoid the reduction in the output of the photoelectric elements which would otherwise result from a reduced energy attributable to the reflection occurring at a remote distance, while the shorter side of the opening corresponds to the position where an image is formed by the radiation beam reflected from a near-by object, thereby suppressing any excessive input and accordingly enabling a sort of automatic input adjustment. By associating the shift of the tapped point of the potentiometer 13 with the displacement of the picture-taking optical system in the manner as shown in FIG. 1, the signal representing the distance of the object corresponding to the output difference between the photoelectric elements 6a and 6b and the signal representing the position of the picture-taking optical system may be compared with each other.

FIG. 2B shows another example of the electric circuit of the photoelectric image position detector, and FIGS. 3D-G illustrate various forms of the mask applicable to the circuit of FIG. 2B. In FIG. 2B, the photoelectric elements 6a and 6b are serially connected with the potentiometer 13' through the electric source E. The tapped point of the potentiometer 13' is connected with one terminal of the electric source E and may be displaced with the displacement of the picture-taking optical system as in the circuit of FIG. 2A. Resistors r' and r'' for protecting the circuit are connected between the potentiometer 13' and the photoelectric elements 6b, 6a, respectively. Any of the masks shown in FIGS. 3D to G is formed so that the lengths of the sides of the opening with respect to the photoelectric elements 6a and 6b are variable with the displacement of the image thereon, and the relation between such lengths is reversed midway of the opening. This will provide a greater variation in the length of the opening, which in turn will provide a wider range of variation in the output difference between the two photoelectric elements and accordingly permit a greater extent of displacement of the tapped point of the potentiometer 13', to a great convenience. The mask shown in FIG. 3G will be suitable for the so-called zone-focus range finding.

Figure 2C:
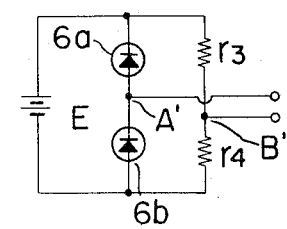

FIG. 2C shows a further modification of the electric circuit of the photoelectric image position detector, and this modification will be further described with reference to FIG. 7.

Figure 4:
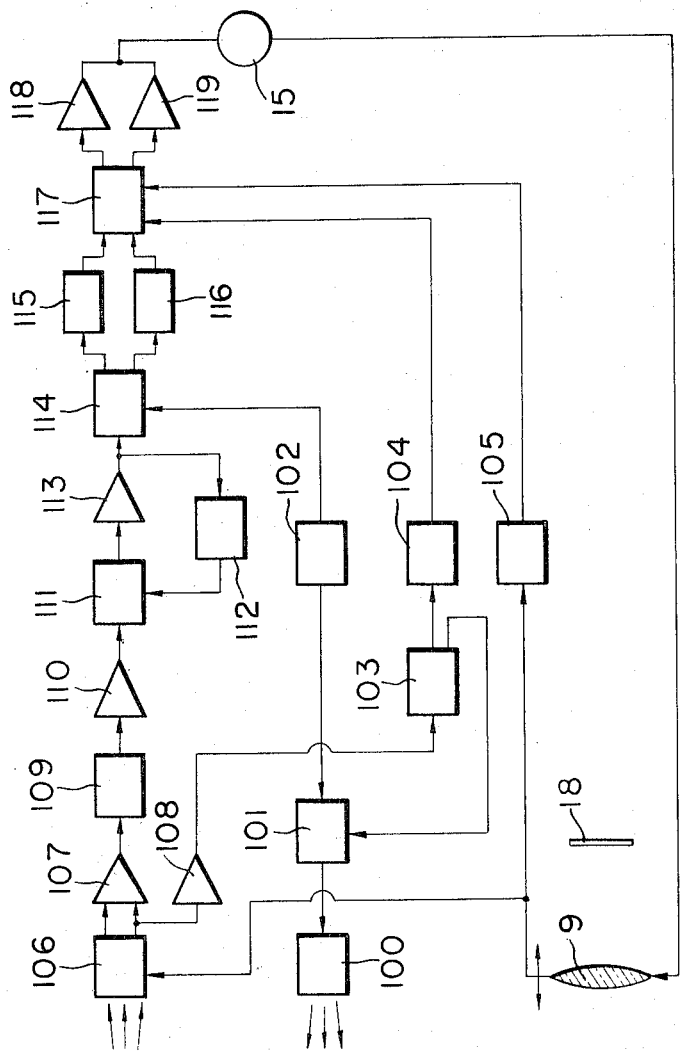
FIG. 4 is a block diagram showing the arrangement of the electric circuit means applicable to the device of FIG. 1.

Referring to FIG. 4, the electric circuit of the automatic focusing device shown in FIG. 1 is illustrated in block diagram. In this figure, the radiation beam to be projected from projector 100 may be previously amplitude modulated at a suitable frequency by a pulse generator 102 and further passed for output control through a power control circuit 101 which is operated by the output from an integration circuit 103 to be described later. The radiation beam reflected by an object may impinge on the photoelectric elements 6a and 6b shown in FIGS. 1 and 2A-B, and pass through a photoelectric detector circuit 106 including the modified bridge circuit as shown in FIG. 2A or 2B and through an unshown capacitor for removing a predetermined level of noise, so that the reflected radiation beam may be photoelectrically converted into the output of a differential amplifier 107. Of course, the output of the differential amplifier 107 is a signal having an amplitude and sign corresponding to the quantitative difference and relative magnitude between the reflected radiations impinging on the photoelectric elements 6a and 6b, i.e., the difference between the position of the object and the current position of the picture-taking optical system. The output from the differential amplifier 107 may be passed through a noise cut filter 109 which removes from such output periodical noises, particularly noises of 100 or 120 Hz attributable to the commercial AC source, whereafter the noise-free signal may be applied to a subsequent automatic gain adjuster means comprising a low level amplifier 110, an adjuster 11, a high level amplifier 113 and a power rectifier 112 for feeding back the output of the amplifier 113 to the adjuster 111. The automatic gain adjuster means serves to supply substantially a predetermined output to the last stage irrespective of the magnitude of the input to the photoelectric detector 106. The output from the automatic gain adjuster means enters a subsequent synchronism detector 114, where the applied signal may be divided into two signals, one of which may be phase-inverted for the synchronism detection by a pulse from the pulse generator 102. The output signal of the synchronism detector 114 may be supplied to only one of two integration circuits 115 and 116 in accordance with the sign of such signal, whereafter it may further be passed through a switching circuit 117 to be described, and then through one of amplifiers 118 and 119 to servomotor 15, which will thus be revolved in a direction corresponding to the sign of the signal applied thereto.

Revolution of the servomotor 15 causes displacement of the picture-taking optical system 9 and the signal from the potentiometer 13 representing the position of this system is fed back to the photoelectric detector, thereby automatically adjusting the focus as described previously. If an object at infinity is aimed at or if the radiation energy reflected from the object is very weak for some reason or other, one output of the photoelectric detector 106 may be directed to the amplifier 108 so as to quickly set the picture-taking optical system to the infinity position or hyper-focal distance, whereafter the output from the amplifier 108 may be integrated by the integration circuit 103 and applied to the input level detector circuit 104. The output from the integration circuit 103 also provides a signal to the power control circuit 101 for controlling the input to the projector 100. The input level detector circuit 104, when supplied with an input lower than a predetermined value, will act on the switching circuit 117 to open the regular signal system leading from 106 via 107, 109, automatic gain adjuster means, 114 to 115 or 116 and close the circuit for applying a signal from position setting circuit 105 associated with the picture-taking optical system 9, thus supplying the signal from the position setting circuit 105 to the amplifier 118 or 119.

Figure 9:
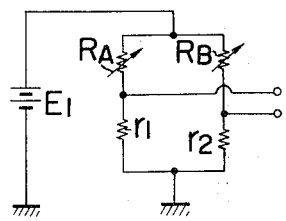
FIG. 9 is a diagram of the position setting circuit of the picture-taking optical system included in the block diagram as shown in any of FIGS. 6 to 8.

As seen in FIG. 9, the position setting circuit 105 may be an ordinary bridge circuit having two sides thereof provided by variable resistors $r1$ and $r2$. The bridge circuit may further include a variable resistor RA having its resistance value variable in response to the movement of the picture-taking optical system, and a variable resistor RB set to a value equal to the resistance value of RA corresponding to the infinity position of hyper-focal distance of the picture-taking optical system. The resistors $r1$ and $r2$ have an equal resistance value. Letter E designates an electric source. This position setting circuit always provides a signal representing the position taken by the picture-taking optical system 9 with respect to its infinity position or hyper-focal distance.

Figure 5:
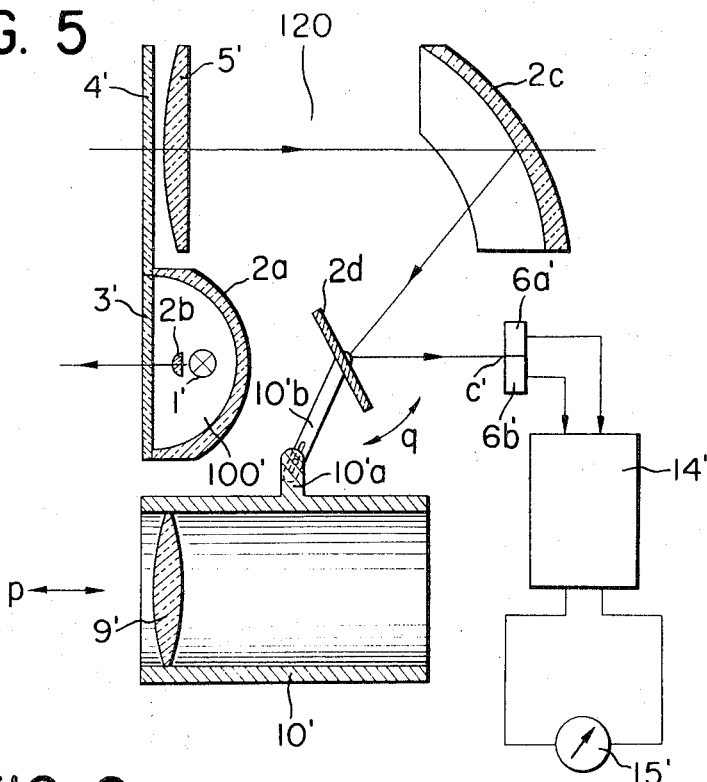
FIG. 5 is a combined sectional view and block diagram of the basic construction of the focusing device according to another embodiment of the present invention, the block diagram showing the electric circuit of such device.

FIG. 5 schematically shows another embodiment of the present invention. A radiation source 1' for emitting a suitable range finding signal to an object may comprise means such as tungsten lamp, discharge tube, luminous diode, laser element or the like. The radiation source 1' is disposed at the focal point of a spherical or parabolic mirror 2a so as to project a parallel beam of radiation on an object. In front of the radiation source 1' there is disposed a condenser lens 2b to prevent scattering of the direct radiation from the radiation source and direct such radiation to the object more effectively. Further in front of the radiation source 1' is disposed a filter 3' for making the beam of radiation into a desired wavelength. When it is desired to make the radiation into infrared rays, the filter 3' may suitably be a filter for intercepting visible light. The aforesaid members together constitute a projector 100'. A ray receiving optical system 120 is juxtaposed with the projector 100'. In front of the ray receiving optical system 120 there is disposed a filter 4' for intercepting noise-making rays of different wavelengths from the wavelength of the projected radiation beam. This filter 4' may of course be common with the aforesaid filter 3'. Disposed behind the filter 4' are cylindrical lens 5' and a spherical mirror 2c. A total reflection mirror 2d is pivotally mounted at a suitable location spaced apart from the optical axis of the cylindrical lens 5', and two photoelectric elements 6a' and 6b ' contiguous with each other along a straight boundary are disposed in opposed relationship with the total reflection mirror 2d. The cylindrical lens 5' functions to converge the reflected radiation from an object only in a predetermined direction and thereby convert the point image of the radiation beam on the object into a linear image extending in the direction perpendicular to the plane of the drawing. Such a linear image may be again magnified and focused by the spherical mirror 2c, and the total reflection mirror 2d is so positioned as to ensure the enlarged linear image thereafter to lie on or in the vicinity of the photoelectric elements 6a' and 6b'. The total reflection mirror 2d is held for pivotal movement about the center thereof, which is coincident with the pivot point of an arm 10'b forming a mechanical connection with a projection 10'a of a body tube 10' for holding a picture-taking optical system 9', and the pivotal movement of the total reflection mirror 2d is caused in the direction of double-headed curvilinear arrow q by movement of the body tube 10' in the direction of double-headed linear arrow p. An electric circuit 14' is provided to produce an output signal corresponding to the input to the photoelectric elements 6a', 6b' and supply such output signal to a meter 15' electrically connected with the two output terminals of the circuit 14'.

In operation, the radiation emitted from the radiation source 1' is given a sufficient directivity by the action of the spherical or parabolic mirror 2a and the condenser lens 2b, and then passed through the filter 3' so that only the component in a specific wavelength range is projected on an object. The reflected radiation from the object enters the ray receiving optical system 120, in which the radiation beam is formed into a linear image through the cylindrical lens 5' and such linear image is again magnified and focused by the spherical mirror 2a and formed through the total reflection mirror 2d into a linear image on or near the photoelectric elements 6a', 6b'. Since the image formed on the spherical mirror 2c has its position on the optical axis of this mirror varied with the distance from the projector 100' to the object, the linear image formed on the photoelectric elements 6a', 6b' through the reflection from the total reflection mirror 2d would move on these photoelectric elements in accordance with the position of the object if the total reflection mirror 2d is stationary. By making an adjustment so that when the linear image is coincident with the boundary line C' between the two photoelectric elements the object image may be focused at a position by the picture-taking optical system 9' while the needle of the meter 15' points at a predetermined position (zero point), the position of the linear image will be shifted with the displacement of the object to thereby produce an unbalance between the outputs of the two photoelectric elements and an output signal corresponding to such unbalance will be supplied through the electric circuit 14' to the meter 15', whose needle will thus be displaced in one direction. While viewing the displacement of the meter needle, the photographer may axially move the body tube 10' until the needle comes to a predetermined position, whereupon the picture-taking system 9' is focused to properly form the object image at a predetermined position. In this way, the focusing of the picture-taking optical system with respect to an object to be photographed can be simply accomplished by the photographer as he observes only the movement of the meter needle.

Figure 6:
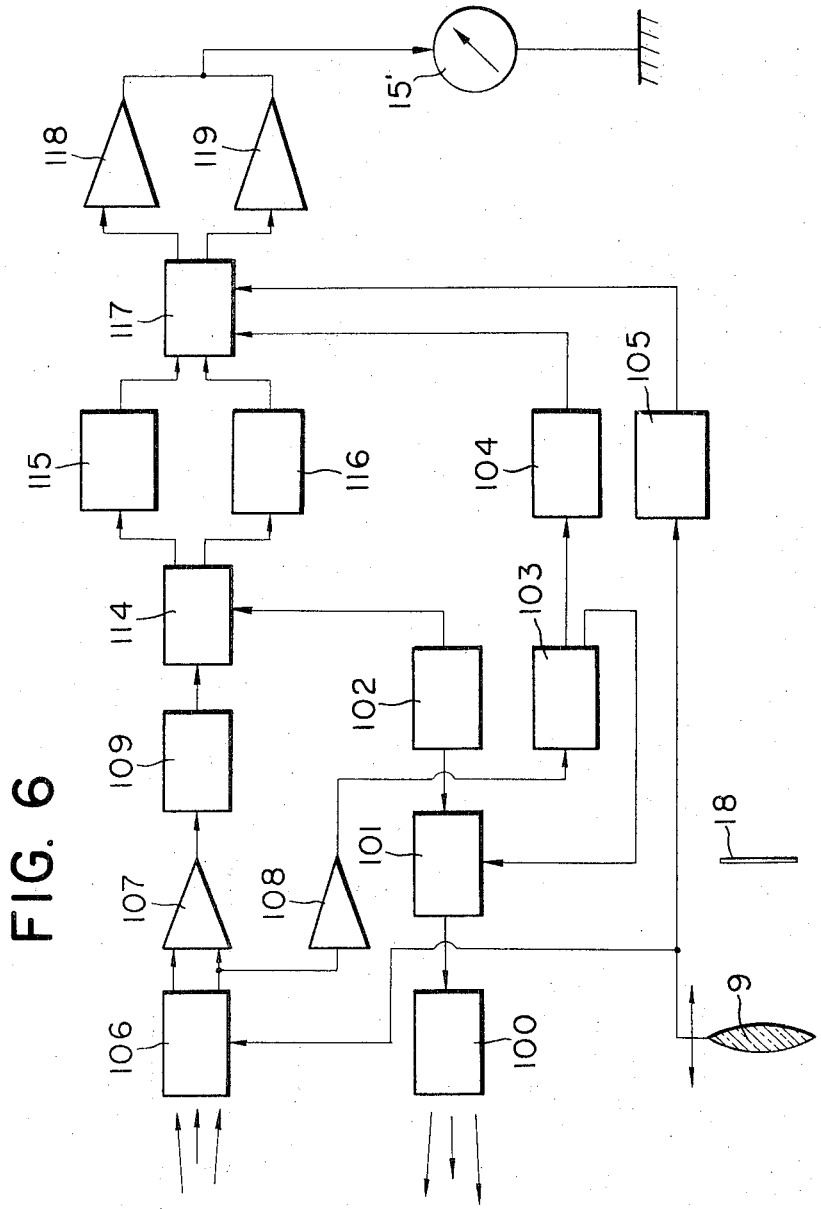
FIG. 6 is a block diagram showing the arrangement of the electric circuit means applicable to the device of FIG. 1 or 5.

FIG. 6 is a block diagram showing the electric connection, particularly in the electric circuit 14' of the above-described device, and also showing the arrangement of the electric circuit 14 which employs a meter 15' instead of the servomotor 15 shown in FIG. 1. The elements similar to those in FIG. 4 are designated by similar reference characters.

In FIG. 6, a radiation beam emitted from projector 100 is previously amplitude-modulated at a suitable frequency by a pulse supplied thereto from pulse generator 102. The output of the projector 100 is preadjusted by power control circuit 101 controlled by the output from amplifier and integration circuits 108 and 103 which will be described later for further details. The radiation beam reflected from an object is directed through an optical system (FIG. 1 and 5) to photoelectric elements 6a, 6b or 6a', 6b', whereafter it is further passed through photoelectric detection circuit 106 including a bridge circuit, and thence through unshown capacitor for removing a predetermined level of noise so that the radiation beam is photoelectrically converted into the output of differential amplifier 107. The output of the differential amplifier 107 is of course a signal having an amplitude and sign corresponding to the quantitative difference and relative magnitude between the radiation impinging on the two photoelectric elements. The output from the amplifier 107 has its periodic noises, particularly noises of 100 or 120 Hz attributable to the commercial AC source, removed by noise cut filter 109 and then enters synchronism detector 114. This synchronism detector divides the input thereto into two signals, one of which is pulse-inverted so as to effect synchronism detection in accordance with a pulse from pulse generator 102. The output signal of the synchronism detector 114 is supplied to only one of the integration circuits 115 and 116 in accordance with the sign of the signal and further passed through amplifier 118 or 119 to thereby displace the needle of meter 151 in a direction corresponding to the sign of the input signal applied thereto. Thus, by mvoing the body tube 10 or 10' including the picture-taking optical system, it is possible to detect the point at which the needle of the meter 15' assumes a predetermined position, i.e., the proper focal point for the object. Since the direction of displacement of the meter needle corresponds to the direction of unbalance of the inputs to the two photoelectric elements, i.e., the focused condition of the picture-taking optical system with respect to the object, the photographer can quickly know from the direction of displacement of the meter needle in which direction he should move the picture-taking optical system, thus achieving proper focusing within a very short time. In the other points, the circuit of FIG. 6 is identical with that of FIG. 4.

Figure 7:
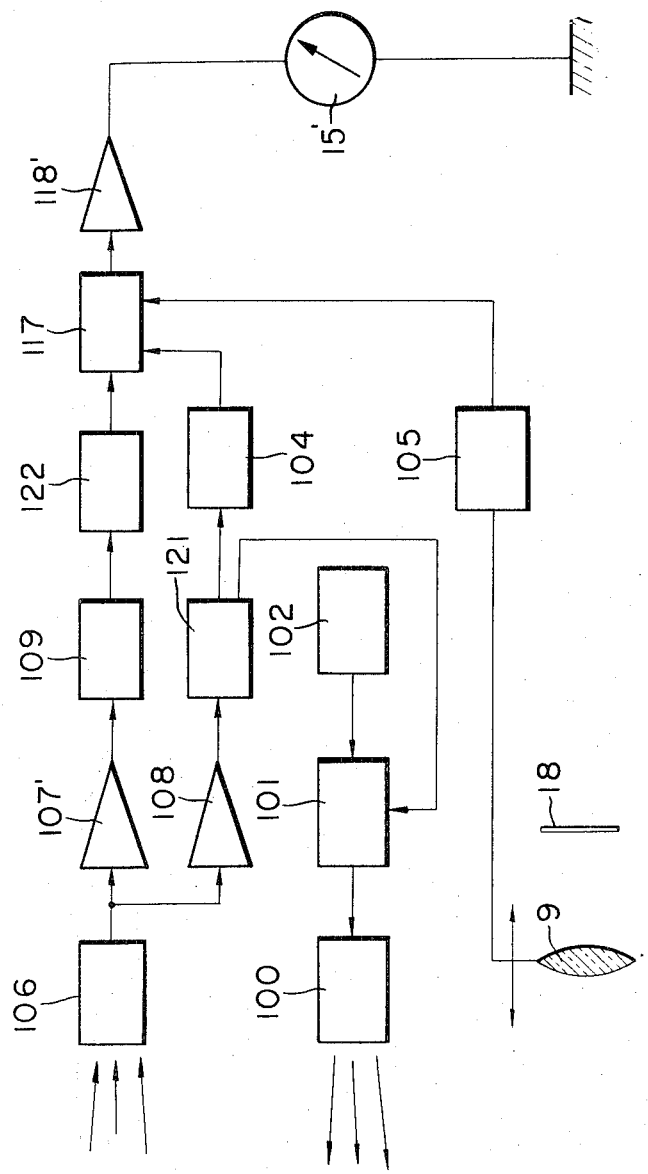
FIGS. 7 and 8 are block diagrams showing modifications of the electric circuit means shown in FIG. 6.

FIG. 7 shows a modification of the FIG. 6 circuit, and similar elements are designated by similar reference characters.

Radiation to be emitted from projector 100 is previously amplitude-modulated by a pulse from pulse generator 102 and controlled by power control circuit 101 which is controlled by the output from rectifier 121 to be described. A beam of radiation reflected from an object passes through a ray receiving optical system to a photoelectric image position detector forming a photoelectric image position detection circuit 106, which photoelectrically converts the radiation beam into an electrical signal, whereafter the signal is passed through an unshown capacitor for removing a predetermined level of noise and then amplified through AC amplifier 107'. The output of the amplifier 107' is further passed through noise cut filter 109 so as to remove any periodic noise, particularly noises of 100 or 120 Hz attributable to the commercial AC source, and thereafter the AC output is converted into a DC output by a subsequent rectifier 122 and passed through a switching circuit 117 (to be described) for amplification by DC amplifier 118' and thence to meter 15'. The output of the meter 15' represents the object distance as described above with respect to FIG. 6.

On the other hand, means comprising amplifier 108, rectifier 121, low level detection circuit 104, position setting circuit 105 and switching circuit 117, as described previously, functions to quickly set the picture-taking optical system to the infinity of hyper-focal distance when the signal level is low.

Turning to FIG. 2C, there is shown an example of the electrical connection of the photoelectric elements in the photoelectric image position detector applicable to the electric circuit of FIG. 7. Photoelectric elements 6a and 6b, provided with a masking as shown in FIGS. 3D-G, are serially connected with each other but parallel-connected with two fixed resistors r3 and r4 of equal resistance value which are serially connected with each other, and the photoelectric elements are supplied with a reverse bias voltage by electric source E. More specifically, the photoelectric elements 6a, 6b and fixed resistors r3, r4 together constitute a modified bridge. Therefore, by deriving the output of the bridge circuit at the point of connection A' between the two photoelectric elements and at the point of connection B' between the two resistors, there may be obtained an output which corresponds to the output difference between the two photoelectric elements and which also genuinely corresponds to the focused position of the object image in the mask without being affected by the brightness of an object variable with such factors as the object distance, reflection factor, etc.

Figure 8:
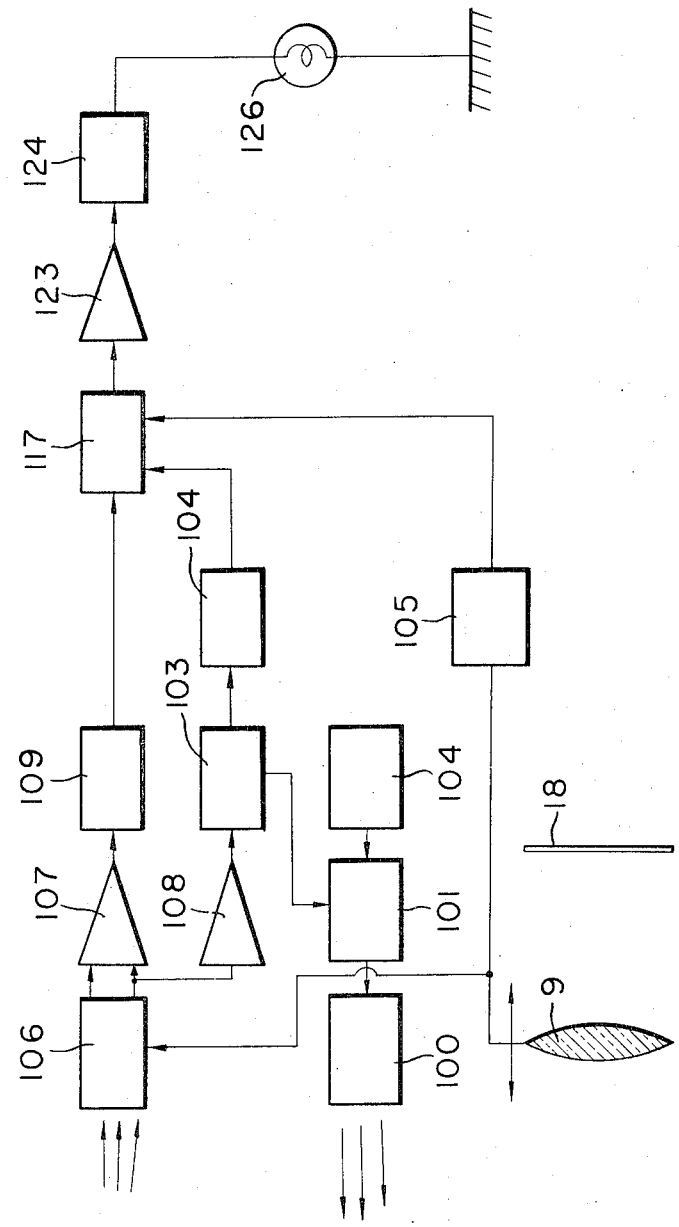

FIG. 8 is a block diagram showing a modification of the FIG. 7 circuit. This circuit is arranged so as to turn on a lamp or other suitable indicator means when proper focusing has been accomplished, thereby indicating the completion of such focusing. Similar elements are designated by similar reference characters used in the previous embodiment.

There are seen AC amplifier 123 and level detection circuit 124 such as Schmidt circuit. In response to a balance established between the inputs to photoelectric elements 11a and 11b, the output of the amplifier 123 becomes zero to thereby turn on a miniature lamp 126. When the inputs to the photoelectric elements 6a, 6b or 6a', 6b' become unbalanced, the output from the amplifier 123 will act on level detector 124 so as not to turn on the miniature lamp 126. The other elements in FIG. 8 perform the same functions as described previously.

Figure 10:
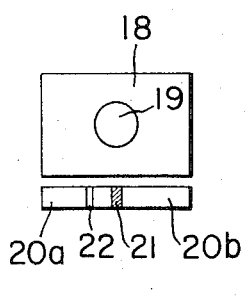
FIG. 10 is a front view showing the meter needle for indicating the focused position as it is displayed in a portion of the viewfinder.

FIG. 10 shows an embodiment of the present invention in which the meter needle for indicating the described properly focused condition is disposed below a viewfinder comprising a viewfinder frame 18 and a sighting mark 19 located centrally of the frame 18. Slightly below the viewfinder frame 18 is disposed a pair of windows 20a, 20b for indicating therethrough the properly focused condition, said windows being separated by an opaque or translucent, thin, linear mullion line 21 disposed centrally therebetween. It will be apparent that the mullion line 21 provides a mark for indicating a reference position corresponding to the properly focused condition, and this line may take any shape or form which is suitable to perform such function. The meter needle, designated by numeral 22, is provided so that the relative position between the meter needle and the reference position indicator mark may clearly indicate the focused condition of the picture-taking optical system. That is, coincidence of the needle 22 with the confine line 21 represents the properly focused condition of the picture-taking system.

When using the above-described arrangement, the photographer may take a sight of an object to the center mark in the viewfinder and manually or otherwise move the picture-taking optical system as he observes the meter needle 22 until it is coincident with the reference line 21, whereupon he may stop the picture-taking optical system, thus accomplishing proper focusing with respect to the object.

Figure 11:
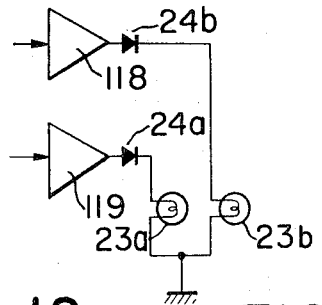
FIG. 11 is a block diagram showing a modification of the output stage portion in FIG. 4 or FIG. 6.
Figure 12:
FIG. 12 is a front view showing a form of indicator means using lamps applicable to the circuit of FIG. 11 for indicating the focused condition as such indicator means is displayed in a portion of the viewfinder.

FIGS. 11 and 12 illustrate a form of the present invention in which the direction for movement of the picture-taking optical system may be indicated more directly. In FIG. 11, meter 15' is replaced by miniature light sources 23a, 23b connected with the amplifiers at the last stage of the FIG. 6 circuit. The miniature light sources 23a, 23b used as indicator means may comprise luminous diodes, tiny tungsten lamps or the like. Especially, luminous diodes will be most suitable in that they provided high luminescence for low inputs and semi-permanent service life. Diodes 24a and 24b are further provided to prevent the occurrence of such a malfunction that current flows from one amplifier to the other to turn on both light sources 23. FIG. 12 shows an example of the construction for ensuring that the condition of the light sources 23 as turned on by the circuit of FIG. 11 is displayed near the viewfinder assembly 18, 19. The light sources 23a and 23b are disposed behind openings 25a and 25b, respectively, so that one of these openings may be illuminated when one of the two light sources is turned on. Thus, the photographer may rotate the picture-taking optical system in the direction as indicated by the particular opening so illuminated. When the inputs to the photoelectric elements are balanced, i.e., when proper focusing has been accomplished, neither light source is turned on to tell the photographer the completion of proper focusing. To readily indicate the direction of rotation for the picture-taking optical system, the openings 25a and 25b may be in the form of arrow as shown.

Figure 13:
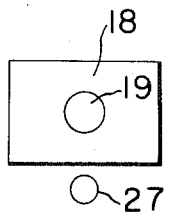
FIG. 13 is a front view showing a form of indicator means using a lamp applicable to the circuit of FIG. 8 as such indicator means is displayed in a portion of the viewfinder.

FIG. 13 shows an example of the indicator means for indicating properly focused condition which is applicable to the electric circuit of FIG. 8. An opening 27 is formed below the viewfinder and on the center line thereof so that a miniature light source 26, when turned on or off, may indicate through the opening whether proper focusing has been done or not.

FIG. 14 schematically shows means for indicating the focused condition within or near the viewfinder by the use of a photoelectric image position detector including the circuit arrangement of FIG. 2C. Those elements designated by numerals 1, 2, 3, 4, 5, 6a, 6b, 7, 8, 9, 10 and 18 perform the same functions as described with respect to FIG. 1. Numeral 15' designates a meter providing the output of the range finger system comprising those elements mentioned just above, i.e., the signal representing the position of an object. The output of the meter 15' is converted through shaft 25 into a displacement of needle 26. The needle 26 is arranged so that the displacmeent thereof may be indicated within a focused condition display window 28 provided below the viewfinder's field 27. Elements 29a, 29b and 29c together constitute an optical system for the viewfinder. On the other hand, there is provided a mechanism for indicating the position of body tube 10 holding the picture-taking optical system. More specifically, support members 30 and 31 support a member 33, and a spring 32 normally urges the member 33 so that one end of the member 33 is brought into contact with one end face of the body tube 10. The member 33 is rotatably held on a support plate 34 by means of screw 36, and is further biased for counter-clockwise rotation, as viewed in the figure, by a spring 35, so that the other end of the member 33 is engaged with a member 37 having a needle-like end 38. The member 37 is disposed so that the needle-like end 38 thereof appears in the focused condition display window 28.

With such an arrangement, movement of the picture-taking optical system along the optical axis thereof will displace the needle-like end 38 due to the engagement between the members 35 and 37 to provide in the display window 28 a displacement signal corresponding to the position of the picture-taking optical system. Accordingly, by manually or otherwise moving the picture-taking optical system until the needle-like end 38 overlaps the needle 26, the photographer may accomplish proper focusing at a point where the needle and the needle-like end overlap together. Wire leads are connected as indicated by A''—A'' and B''—B''.

Figure 15:
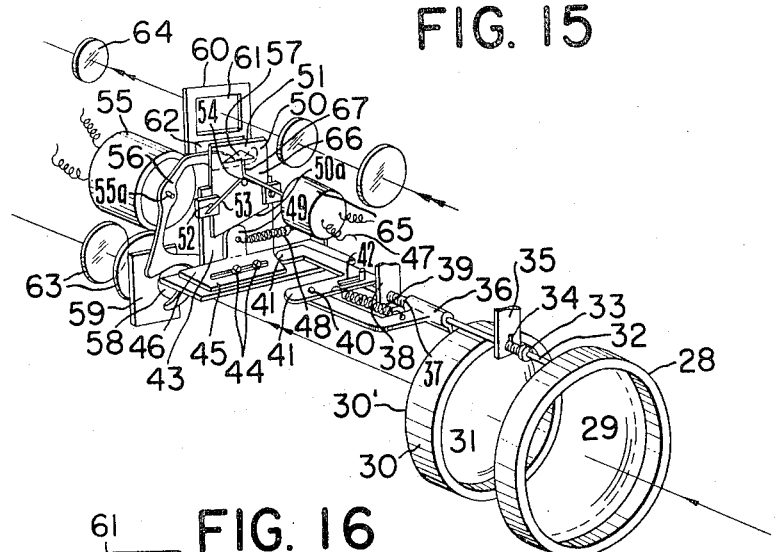
FIG. 15 is a schematic perspective view showing another specific example of the device to which the present invention is applicable.
Figure 16:
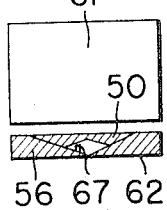
FIG. 16 is a front view showing the indicator means for the focused condition applicable to the device of FIG. 15 as such means is displayed in a portion of the viewfinder.

FIG. 15 schematically illustrates the mechanism for indicating the depth of field in addition to the focused condition, and FIG. 16 shows the manner in which such information is displayed below the viewfinder. In FIG. 15, body tube 28 holds a focusing lens 29 therein and tube 30 holds a zoom lens 31 therein. A member 32 for detecting the position of the focusing lens 29 has one end thereof normally urged against the tube 28 by a compression spring 34 provided between a support member 35 and a flanged portion 33. A member 36 for detecting the position of the zoom lens 31 is coaxially and slidably mounted on the member 32 and biased into contact with the camming surface 30' of the tube 30 for the zoon lens 31 by the force of a compression spring 37 wound around the member 32 and having one end secured to a support member 38. A member 41 is pivotally mounted on the member 36 at one end thereof by means of pin 40, and formed with a slot 42 for slidably engaging one end of the member 32 which is bent. Between the member 41 and the member 36 there is provided a low tension spring 39 to eliminate any rattling at the point of engagement between the member 32 and the slot 42. The member 41 is U-shaped with the other leg portion thereof resting on a support member 43, and by a tension spring 48 it is brought into contact with a member 46 which is slidable on the support member 43 in a predetermined direction due to the engagement of screws 44 and slot 45 while maintaining a close contact with one leg portion of the member 41. One end 49 of the member 46 which is vertically upwardly extended is normally maintained in engagement with the camming surface 50a of a member 50 by a spring 53 secured to a pin 54 studded in the member 50, which is formed with a triangular opening 51 and engaged with and vertically slidable along guide portions 52 forming a part of the support member 43. An automatic aperture meter 55 has an aperture setting blade 56 secured to the rotary shaft 55a thereof, one end of which blade 56 has an opening 58 lying in the picture-taking optical path and the other end has a cut-away portion 57 of such a shape as to cooperate with the triangular opening 51 of the member 50 to define a lonzenge-shaped opening. The lozenge aperture becomes wider as the photographic aperture 58 is reduced and hence the lozenge width is an indication of depth of field. A fixed diaphragm 59 is provided to cooperate with the opening 58 of the aperture setting blade 56 to control the quantity of light passing along the picturetaking optical path. A relay optical system 63 is also provided in the picture-taking optical path.

On the other hand, a viewfinder frame member 60 is disposed in the optical path of a viewfinder comprising an optical system 64, and has a viewfinder frame 61 and a display window 62 therebelow. A meter 65 for indicating the focused condition is provided to displace a needle 67 by means of a shaft 66. The relative position of the triangular opening 51 in the member 50, the cut-away portion 57 formed at one end of the aperture setting blade 56 and the needle 67 is selected such that, as shown in FIG. 16, the cut-away portion 57 of the aperture setting blade 56 and the triangular opening 51 of the member 50 cooperate together to clearly define a lozenge shape within which the needle 67 may be clearly seen depending on the position of such needle. When the lozenge is wider, indicating greater field depth, a wider departure of the needle 67 from center is visible, in conformance with the greater focus tolerance on account of the greater field depth.

In operation, the linkage comprising members 32, 36 and 41 causes movement and slight rotation of one end 41' of the member 41 in response to the individual or simultaneous movement of the tubes 28 and 30. Such movement is accomplished by the sliding movement of the member 46 on the member 43 and at the same time, the triangular opening 51 is vertically moved by the coaction between one end 49 of the member 46 and the camming surface forming one surface of the member 50. On the other hand, the cut-away portion 57 formed in one end of the aperture setting blade 56 will be rotated in response to the rotation of the shaft of the aperture meter 55, but by providing a suitably long distance between the center of the cut-away portion 57 and the meter shaft, the movement of the cut-away portion 57 may be made into substantially vertical displacement. If an associated mechanism is so designed that the size of the lozenge shape determined by the relative movement of the triangular opening 51 and the cut-away portion 57 of the aperture setting blade 56 provides the current depth of field due to the relationship with the displacement of the needle of the focused condition indicating meter 65, then the photographer can know, by recognizing the needle 67 in the lonzenge shape, that the focusing is properly taking place within a depth of field as determined by such factors as the current position of the focusing lens, the focal length of the zoom lens and the relative aperture, thus enabling necessary and sufficient focusing to be readily accomplished. In the above-described arrangement, it will be apparent that the shape of the frame representing the depth of field is not necessarily limited to the shown lozenge shape.

Figure 18:
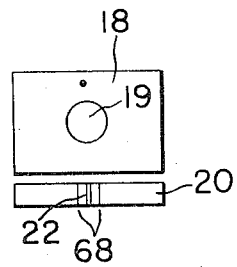
FIG. 18 is a front view showing the indicator means for the focused condition applicable to the circuit arrangement of FIG. 17 as such means is displayed in a portion of the viewfinder.
Figure 17:
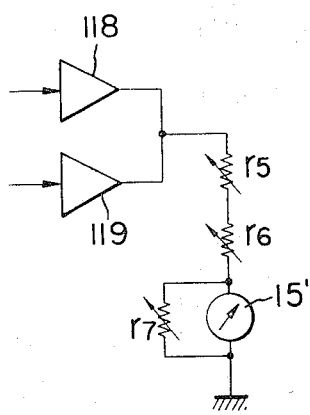
FIG. 17 is a block diagram showing a modified form of the output stage portion in FIG. 4 or 6.
Figure 19:
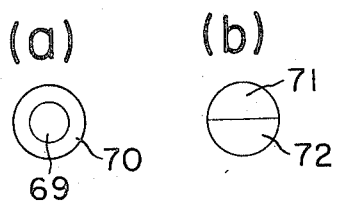
FIGS. 19A and B are front views showing partial modifications of the indicator means shown in FIG. 18.

FIGS. 17, 18, 19A and B show a system whereby the sensitivity of the meter for indicating the focused condition in accordance with the depth of field may be adjusted to accomplish the focusing in such a manner as to satisfy the depth of field.

In FIG. 17, variable resistors $r5$ and $r6$ are serially connected and variable resistor $r7$ parallel-connected, with the amplifiers at the last stage of the electric circuit shown in FIG. 6. The resistors $r5$ and $r6$ have their resistance values individually variable with the rotation of the focusing and zoom lenses in the picture-taking optical system. The resistor $r7$ has its resistance value so set as to be variable with the output of the aperture meter 15'. Although this resistor $r7$ may be mechanically associated with the aperture meter 15', it will be apparent that the resistance value of the resistor can be varied with the output of the aperture meter by using a photoelectric element to vary the resistance value in accordance with the brightness of ambient light. In such a meter circuit, if the resistance values of the resistors $r5$ and $r6$ are set so as to increase when the focusing lens is rotated in the direction toward the infinity position and when the zoom lens is moved in the direction for reducing the focal distance of the picture-taking optical system, and if the resistance value of the resistor $r7$ is set so as to decrease with the increase in the brightness of ambient light, then a smaller output current will flow through the meter for a greater depth of field, thus reducing the sensitivity of the meter, and vice versa for a smaller depth of field. In this way, the sensitivity of the meter is variable in dependence of the depth of field.

In FIG. 18, a central marker 68 comprising two thin lines or two linear areas of different transparency from the surrounding areas is provided near the center of focused condition display window 20 disposed below viewfinder 18. The meter needle is designated by 22. The sensitivity of the meter needle for displacement is variable with the depth of field as described above with respect to FIG. 17, and therefore, by setting the meter needle 22 so that proper focusing may take place when the meter needle lies in the between the lines 68, the sensitivity of the meter needle may be increased with a decrease in the depth of field. Thus, the photographer must rotate the focusing lens more carefully to position the meter needle in the area between the line 68, thereby accomplishing a necessary and sufficient focusing corresponding to the depth of field.

In FIGS. 19A and B, there are shown examples of the photoelectric converter element for modifying the focus meter which may be used instead of the resistor r7. Since the variable resistor must have its resistance value variable in accordance with the brightness of ambient light, the photoelectric converter element employed for such variable resistor may most ideally be formed integrally with a photoelectric converter element for controlling the aperture meter. As shown, two photoelectric converter elements 69 and 70 or 71 and 72 are divisionally provided on a common substrate, and one of these elements provide the element for controlling the aperture meter and the other may provide the variable resistor. It will be apparent that the shapes of these photoelectric converter elements are not limited to the shown examples as long as the aforesaid conditions are satisfied.

It will thus be appreciated that the present invention may be embodied in various forms and includes an arrangement also applicable to other cases than where a radiation source is requisite as a component of the focusing device.

Some further considerations of the present invention will briefly be described below. As in FIG. 1, the radiation source 1 should preferably emit a linear or fan beam of radiation in order that the linear image I may be scanned substantially along the boundary line C. Since the photoelectric detector comprising mask 8 and photoelectric elements 6a, 6b may be any one whose output characteristic is monotonously variable in accordance with the position of the projected radiation beam, the mask 8 is not always required to monotonously vary its opening width when the output characteristic of the plural photoelectric converter elements satisfies the foregoing conditions.

We claim:

1. A focusing device for optical instruments comprising:
    ray projection means for projecting a narrow beam of light on an object;
    ray receiving means offset from said ray projection means including at least one ray receiving optical system for transmitting therethrough radiation from an object and capable of forming an image of the portion of said object illuminated by said ray projection means;
    photoelectric converter means including at least two photoelectric elements functioning substantially individually and contiguous with each other along a straight line boundary, said converter means being arranged to receive radiation through said ray receiving optical system from the illuminated portion of said object to form an illuminated image thereof on said photoelectric elements;
    masking means including an opening to control the effective light receiving surfaces of said at least two photoelectric elements, said opening being shaped and so disposed relative to said straight line boundary as to change the ratio of the outputs of said at least two photoelectric elements caused by the illuminated image of the object in response to the position of said image on their said effective light receiving surfaces;
    image forming means including at least one image forming optical system having an optical axis at least approximately parallel to the optical axis of said ray receiving means and adjustable in the direction along said first-mentioned optical axis; and
    control means including a circuit having at least said photoelectric elements of said photoelectric converter means and including an amplifier the input of which receives the output of said circuit;
    said control means being operatively connectable with said image forming means, and arranged to produce when so connected a control signal for adjusting said adjustable image forming optical system to focus on the object.

2. A focusing device according to claim 1, wherein said control means includes drive means for driving said image forming optical system of said image forming means in the direction along the optical axis thereof.

3. A focusing device according to claim 2, wherein said drive means includes a servomotor.

4. A focusing device according to claim 1, wherein said control means includes indicator means for indicating the focused condition.

5. A focusing device according to claim 4, wherein said indicator means includes an indicator member capable of display in at least a portion of a viewfinder.

6. A focusing device according to claim 5, wherein said indicator member comprises a meter which can display at least a portion of the needle thereof in said viewfinder.

7. A focusing device according to claim 4, wherein said indicator means includes at least one luminous member adapted to indicate the focused condition by flashing.

8. A focusing device according to claim 7, wherein said indicator means includes means for controlling the flashing of said luminous member, said latter means being adapted to selectively flash one of two or more luminous members in accordance with a control signal from said control means.

9. A focusing device according to claim 4, wherein said indicator means can simultaneously indicate the information representing the set position of said adjustable image forming optical system and the information representing a position corresponding to the object distance.

10. A focusing device according to claim 4, wherein said indicator means includes means for approximately indicating the depth of field.

11. A focusing device according to claim 1, wherein said control means is set so that the output thereof assumes a predetermined value when said image forming optical system is in focused condition.

12. A focusing device according to claim 11, wherein said photoelectric converter means can detect the magnitude and direction of the difference between the object distance and the set position of said image forming optical system, and said control means includes means capable of indicating said difference in a viewfinder.

13. A focusing device according to claim 1, wherein said control means includes means associated with said image forming means to associate movement of said adjustable image forming optical system with movement of at least one portion of said ray receiving optical system in a predetermined relationship.

14. A focusing device for optical instruments comprising:
    a radiation source;
    projector means including optical means for projecting a narrow beam of radiation toward an object;

ray receiving means offset from said projector means including at least one ray receiving optical system for transmitting therethrough radiation from said object and capable of forming an image of the portion of said object illuminated by said projector means said ray receiving optical system including means for elongating said image in a direction transverse to the direction of offset of said ray receiving means from said projector means;

photoelectric converter means having a light-receiving face and including at least two photoelectric elements functioning substantially individually and contiguous with each other along a straight line boundary disposed parallel to said direction of offset of said receiving means and transverse to the elongation of said image by said elongating means, said converter means being arranged to receive radiation through said ray receiving optical system from the illuminated portion of said object to form an illuminated image thereof on said photoelectric elements that extends across both of said two elements regardless of the position of said image along said boundary line;

masking means disposed in contact with said light receiving face of said at least two photoelectric elements and including an opening to control the effective light receiving surfaces of said at least two photoelectric elements, the opening being so formed that the ratio of the outputs of said at least two photoelectric elements, will vary essentially in response to the position of said image on said effective light receiving surfaces;

image forming means including at least one image forming optical system adjustable in the direction along the optical axis thereof; and control means including a circuit having at least said photoelectric elements of said photoelectric converter means and including an amplifier the input of which receives the output of said circuit;

said control means being operatively connectable with said image forming means, and producing a control signal for adjusting said adjustable image forming optical system to focus on the object.

15. A focusing device for an optical instrument utilizing rays from an object to be focused, comprising:

a ray receiving optical system for transmitting therethrough rays from said object and capable of forming an image of said object;

photoelectric converter means including at least two photoelectric elements functioning substantially individually and contiguous with each other along a straight line boundary, said converter means being arranged to receive said rays through said ray receiving optical system from the object to form an image thereof on said photoelectric elements that extends across both of said two elements and to produce an electrical signal corresponding to the relative amounts of said rays received on said two photoelectric elements respectively;

masking means disposed in front of said photoelectric elements so as to restrict the area thereof on which said rays from said object impinge on said photoelectric elements, and shaped to control the relative amounts of said rays impinging on the said two photoelectric elements respectively in such a manner that the electrical ratio signal of said photoelectric converter means is varied in accordance with the position of said image thereon;

a focusing optical system adjustable in the direction along the optical axis thereof to focus the object; and control means connected to said photoelectric converter means to receive the electrical signal thereof and operatively connectable with said focusing optical system to detect a position of said focusing optical system so as to produce a control signal for adjusting said adjustable focusing optical system to focus on the object.

16. A focusing device according to claim 15, wherein said masking means has an opening for controlling the radiation incident on said photoelectric elements and said opening is adapted to control the quantity of incident radiation in accordance with the position of the image formed on said photoelectric elements, said position being variable along the boundary between said elements in accordance with the object distance.

17. A focusing device in accordance with claim 15, wherein said photoelectric converter means produces an output providing information corresponding only to object distance.

18. A focusing device according to claim 17, wherein said control means includes detector means for detecting the set position of said adjustable image forming optical system to produce information corresponding to said set position.

19. A focusing device according to claim 18, wherein said control means includes comparator means for comparing the information representing the object distance and the information representing the set position of said adjustable image forming optical system to produce a control signal representing the magnitude and direction of the difference between said two types of information.

20. A focusing device according to claim 15, wherein said ray receiving means includes at least one optical element for elongating the radiation image of the illuminated portion of said object in a direction substantially perpendicular to said straight line boundary between said photoelectric elements.

21. A focusing device according to claim 20, wherein said optical element comprises a cylindrical lens.

22. A focusing device for optical instruments with a view finder comprising:

a ray receiving optical system for transmitting therethrough rays from an object and capable of forming an image of said object;

photoelectric converter means including at least two photoelectric elements functioning substantially individually and contiguous with each other along a straight line boundary, said converter means being arranged to receive said rays through said ray receiving optical system from said object to form an image thereof on said photoelectric elements that extends across both of said two elements and produce an electrical ratio signal corresponding to the amounts of said rays respectively received on said two photoelectric elements;

masking means disposed on the photoelectric elements thereof so as to restrict the area on which said rays from said object impinge and shaped to control the relative amounts of said rays impinging respectively on said photoelectric elements according to the position of said image a focusing optical system adjustable in the direction along its optical axis to focus on the object;

control means connected to said photoelectric converter means to receive the electrical signal thereof and operatively connectable with said focusing optical system to detect a position of said focusing optical system so as to produce a control signal for adjusting said adjustable focusing optical system to focus on the object;

means for indicating the status of focus including a detecting member for detecting the position of said focusing optical system and an indicating member for indicating the position detected by said detecting member, said indicating member being positioned in the path of said view finder of said optical instrument thereby to indicate the status of focus in said view finder.

23. A focusing device for optical instruments provided with a viewfinder, comprising:

ray projecting means for projecting a narrow beam of light in a predetermined direction toward an object to be focused on;

ray receiving means offset from said ray projection means including at least one ray receiving optical system for transmitting therethrough radiation from the object and capable of forming an image of the portion of said object illuminated by said ray projection means;

photoelectric converter means including at least two photoelectric elements functioning substantially individually and contiguous with each other along a straight line boundary, said converter means being arranged to receive radiation through said ray receiving optical system from the illuminated portion of said object to form an illuminated image thereof on said photoelectric elements and produce an output signal corresponding to the relative amounts of light of said formed image on said respective photoelectric elements;

radiation receiving control means disposed on the photoelectric elements in order to control the amount of radiation light impinging on said photoelectric elements and shaped so as to vary the output signal of said photoelectric converter means in accordance with the position of said image thereon;

focusing optical means adjustable in the direction along the optical axis thereof to vary the focus condition;

control means connected to said photoelectric converter means to receive the output signal thereof and operatively connectable with said focusing optical means to detect a signal representing the current position of said focusing optical means so as to compare the both signals and produce a control signal for adjusting said focusing optical means to focus on the object; and focus indicating means adapted to be indicatable in the viewfinder of the optical instrument in accordance with the adjustment of said focusing optical means.

* * * * *